(12) United States Patent
Fellinger et al.

(10) Patent No.: US 11,802,650 B2
(45) Date of Patent: Oct. 31, 2023

(54) METHODS AND MATERIALS TO UNIVERSALLY FIT DUCT LINER INSULATION FOR OVAL HVAC DUCT SYSTEMS

(71) Applicant: JOHNS MANVILLE, Denver, CO (US)

(72) Inventors: Thomas John Fellinger, Littleton, CO (US); Michaela Roxane Roy, Centennial, CO (US); Ames Kulprathipanja, Broomfield, CO (US); Brennan Hall, Arvada, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/720,464

(22) Filed: Apr. 14, 2022

(65) Prior Publication Data

US 2022/0235895 A1   Jul. 28, 2022

Related U.S. Application Data

(62) Division of application No. 16/001,177, filed on Jun. 6, 2018, now Pat. No. 11,333,287.

(51) Int. Cl.
| | | |
|---|---|---|
| *F16L 9/14* | (2006.01) | |
| *F16L 59/02* | (2006.01) | |
| *F24F 13/24* | (2006.01) | |
| *F24F 13/02* | (2006.01) | |
| *F16L 59/147* | (2006.01) | |
| *B32B 1/08* | (2006.01) | |

(52) U.S. Cl.
CPC ........... *F16L 59/026* (2013.01); *F16L 59/147* (2013.01); *F24F 13/0263* (2013.01); *F24F 13/24* (2013.01); *B32B 1/08* (2013.01); *B32B 2307/304* (2013.01); *B32B 2597/00* (2013.01); *F16L 59/02* (2013.01); *F16L 59/028* (2013.01)

(58) Field of Classification Search
CPC ..... F16L 59/026; F16L 59/147; F16L 59/028; F24F 13/24; F24F 13/0263
USPC .............................................. 138/149, 97, 98
See application file for complete search history.

(56) References Cited

U.S. PATENT DOCUMENTS

| | | | |
|---|---|---|---|
| 3,425,455 A | | 2/1969 | Kilpert et al. |
| 3,709,772 A | * | 1/1973 | Rice ........................ F16L 59/00 264/43 |
| 4,363,504 A | | 12/1982 | De Feo et al. |
| 4,452,279 A | | 6/1984 | Atwell |
| 5,010,440 A | | 4/1991 | Endo |
| 5,697,282 A | | 12/1997 | Schakel et al. |

(Continued)

*Primary Examiner* — James F Hook
(74) *Attorney, Agent, or Firm* — Robert D. Touslee

(57) ABSTRACT

The present disclosure relates generally to duct liner insulation products for curvilinear ducts, and more specifically relates to methods and materials to universally fit duct liner insulation for lining oval ducts in air conditioning, heating, and ventilating (HVAC) systems. A duct liner insulation for a curvilinear duct is provided that includes an insulation layer configured to line an interior surface of a curvilinear duct when installed within the curvilinear duct. The duct liner insulation also includes an elastically deformable layer configured to compress the insulation layer against the interior surface of the curvilinear duct when installed within the curvilinear duct such that the insulation layer extends substantially uniformly around an inner periphery of the curvilinear duct.

19 Claims, 3 Drawing Sheets

(56) References Cited

U.S. PATENT DOCUMENTS

| | | |
|---|---|---|
| 5,698,056 A | 12/1997 | Kamiyana et al. |
| 5,762,109 A | 6/1998 | Matthews et al. |
| 5,855,154 A | 1/1999 | Schakel et al. |
| 5,934,332 A | 8/1999 | Rodriguez et al. |
| 5,953,818 A | 9/1999 | Matthews et al. |
| 5,971,034 A | 10/1999 | Heisey et al. |
| 6,148,867 A | 11/2000 | Matthews et al. |
| 6,425,419 B1 | 7/2002 | Attra |
| 6,444,289 B1 | 9/2002 | Ernest |
| 6,457,237 B1 | 10/2002 | Matthews et al. |
| 7,220,470 B2 | 5/2007 | Toas et al. |
| 8,240,338 B2 | 8/2012 | Kamiyana et al. |
| 9,827,745 B2 | 11/2017 | Wardle et al. |
| 11,333,287 B2 | 5/2022 | Fellinger et al. |
| 2003/0138298 A1 | 7/2003 | Mercier |
| 2005/0031819 A1 | 2/2005 | Mankell et al. |
| 2005/0161100 A1 | 7/2005 | Pleydon et al. |
| 2005/0189028 A1 | 9/2005 | Burkes |
| 2011/0126390 A1 | 6/2011 | Potter et al. |
| 2015/0362119 A1 | 12/2015 | Parks et al. |

\* cited by examiner

METHODS AND MATERIALS TO UNIVERSALLY FIT DUCT LINER INSULATION FOR OVAL HVAC DUCT SYSTEMS

CROSS-REFERENCE TO RELATED APPLICATIONS

This application is a division of pending U.S. application Ser. No. 16/001,177 filed Jun. 6, 2018. The entire contents of the above-identified application are herein incorporated by reference for all purposes.

BACKGROUND OF THE INVENTION

The present disclosure relates generally to duct liner insulation products for curvilinear ducts, and more specifically relates to methods and materials to universally fit duct liner insulation for lining oval ducts in air conditioning, heating, and ventilating (HVAC) systems. Ducts of HVAC systems are generally lined with rigid, semi-rigid, or flexible glass fiber duct liner insulation. Duct liner insulation may control or attenuate acoustical or thermal transmissions within and through the HVAC systems to reduce transmitted noise and conserve energy. However, there is currently no universal solution to line oval ducts or pipes of various sizes in the HVAC industry. Due to their transverse cross-sectional configuration, oval ducts or pipes have both major and minor axes and therefore, numerous potential dimensional or size combinations and configurations relative to round or spiral ducts.

A current industry solution to line such ducts while avoiding the use of a custom product includes using commonly available high density fiber glass blanket liners (e.g., 1.5 pcf or greater). While such high density fiber glass blanket liners are generally sufficiently resilient to remain in place within the oval duct, a resulting airstream surface may be inconsistent (e.g., uneven, non-uniform, or unsmooth) due to bends that may arise or occur in the duct liner as the blanket recovers towards the edge of the oval duct during installation. An inconsistent airstream surface may directly affect HVAC calculations for pumps or compressors coupled to the ducts resulting in inefficiencies in the system. Another typical solution includes installing customized kerfed fiberglass blanket liners sized for a particular round or spiral duct into an oval duct. This may result in unwanted, dislodged, or exposed fibers from the kerfed fiberglass blanket liner in the oval duct airstream due to dimensional differences between the oval duct and the round or spiral duct the kerfed blanket liner was originally sized and configured to accommodate. Therefore, there remains a need for a universal duct liner insulation solution adapted for or configured to accommodate oval (e.g., true or flat oval) pipes or ducts of multiple sizes and dimensions with desired R-values. In particular, there remains a need for improved duct liner insulation products for oval ducts or pipes that are less costly to manufacture or install, or reduce or prevent inconsistent airstream surfaces, or unwanted, dislodged, or exposed fibers when installed within the oval duct or pipe.

BRIEF SUMMARY OF THE INVENTION

The embodiments described herein relate generally to duct liner insulation products for curvilinear ducts, and more specifically relate to methods and materials to universally fit duct liner insulation for lining oval ducts in HVAC systems. The duct liner insulation may include an insulation layer and an elastically deformable layer configured to compress the insulation layer against an interior surface of a curvilinear duct (e.g., an oval duct) in a substantially uniform manner. This creates an even or substantially even insulation layer around an interior of the curvilinear duct resulting in a smooth and consistent airstream surface therethrough which allows for improved air flow efficiency in the HVAC system. Additionally, the elastically deformable layer may support the insulation layer within the curvilinear duct such that the insulation layer does not droop or sag downward which may detrimentally affect its acoustical, thermal, or insulation performance. Further, as a sheet or roll of the duct liner insulation (e.g., insulation or elastically deformable layer) may be cut to almost any desired length or width, the duct liner insulation may also provide a universal solution for multiple-sized curvilinear ducts (e.g., any or virtually any duct sizes) and desired R-values without using a custom product (e.g., kerfed fiberglass liners customized for individually sized ducts).

According to a first aspect, a duct liner insulation for a curvilinear duct is provided that includes an insulation layer configured to line an interior surface of a curvilinear duct when installed within the curvilinear duct. The duct liner insulation also includes an elastically deformable layer configured to compress the insulation layer against the interior surface of the curvilinear duct when installed within the curvilinear duct such that the insulation layer extends substantially uniformly around an inner periphery of the curvilinear duct.

In some embodiments, the insulation layer is installed within the curvilinear duct and the elastically deformable layer extends around an inner periphery of the insulation layer. The curvilinear duct may have an oval, round, or spiral cross sectional configuration. In certain embodiments, the curvilinear duct has a flat oval cross sectional configuration. The elastically deformable layer may be constructed out of one or more of inorganic glass, PVC, plastic, or metal. In some embodiments, the elastically deformable layer is constructed out of nonwoven inorganic glass. In some embodiments, the insulation layer is constructed out of fiberglass, mineral wool, or cellulose.

In some embodiments, the insulation layer and the elastically deformable layer are configured to have substantially same cross sectional configurations as the curvilinear duct when the insulation and elastically deformable layers are installed within the curvilinear duct. The elastically deformable layer may be movable between an expanded position and a collapsed position. The elastically deformable layer may be movable to the collapsed position for insertion into the curvilinear duct and to the expanded position to compress the insulation layer against the interior surface of the curvilinear duct when installed within the curvilinear duct. The elastically deformable layer may be movable to the collapsed position from the expanded position in response to a force applied upon the elastically deformable layer and wherein the elastically deformable layer is movable to the expanded position from the collapsed position when the force is released.

In certain embodiments, the insulation layer has a first thickness when installed within the curvilinear duct and a second thickness when compressed against the interior surface of the curvilinear duct by the elastically deformable layer, wherein the second thickness is less than the first thickness. In some embodiments, the insulation layer does not include one or more rows of kerfs. In some embodiments, the insulation layer does not include foam insulation material. The insulation layer may be configured to directly contact the interior surface of the curvilinear duct without any intermediary layers therebetween when the insulation layer is installed therein. In certain embodiments, the insulation layer and elastically deformable layer are separate layers that are not coupled together prior to being installed within the curvilinear duct.

In a second aspect, a method of installing duct liner insulation in a curvilinear duct is provided that includes positioning an insulation layer configured to line an interior surface of a curvilinear duct within the curvilinear duct. The method further includes positioning an elastically deformable layer within the curvilinear duct, the elastically deformable layer configured to compress the insulation layer against the interior surface of the curvilinear duct such that the insulation layer extends substantially uniformly around an inner periphery of the curvilinear duct.

In certain embodiments, the insulation layer and elastically deformable layer are positioned within the curvilinear duct simultaneously. In other embodiments, the insulation layer is positioned within the curvilinear duct prior to the elastically deformable layer.

In some embodiments, the method further includes applying a force upon the elastically deformable layer to move the elastically deformable layer from an expanded position to a collapsed position prior to positioning the elastically deformable layer within the curvilinear duct. The method may further include positioning the elastically deformable layer within the curvilinear duct in the collapsed position. The method may further include releasing the applied force upon the elastically deformable layer after positioning the elastically deformable layer within the curvilinear duct, the elastically deformable layer returning to the expanded position within the curvilinear duct after the applied force is released. The method may further include compressing the insulation layer against the interior surface of the curvilinear duct such that the insulation layer extends substantially uniformly around an inner periphery of the curvilinear duct as the elastically deformable layer returns to the expanded position within the curvilinear duct.

In certain embodiments, the insulation layer and the elastically deformable layer have substantially same cross sectional configurations as the curvilinear duct when the insulation and elastically deformable layers are installed within the curvilinear duct. In some embodiments, the curvilinear duct has a flat oval cross sectional configuration. In some embodiments, the insulation layer has a first thickness when installed within the curvilinear duct and a second thickness when compressed against the interior surface of the curvilinear duct by the elastically deformable layer, wherein the second thickness is less than the first thickness. In certain embodiments, the method may further include coupling the elastically deformable layer to the insulation layer after the elastically deformable and insulation layers are positioned within the curvilinear duct.

In a third aspect, a duct liner insulation product is provided consisting essentially of an insulation layer configured to line an interior surface of a curvilinear duct when installed within the curvilinear duct and an elastically deformable layer configured to compress the insulation layer against the interior surface of the curvilinear duct when installed within the curvilinear duct such that the insulation layer extends substantially uniformly around an inner periphery of the curvilinear duct.

In some embodiments, the insulation layer has a first thickness when installed within the curvilinear duct and a second thickness when compressed against the interior surface of the curvilinear duct by the elastically deformable layer, wherein the second thickness is less than the first thickness. In certain embodiments, the insulation layer and elastically deformable layer have substantially uniform flat oval cross sectional configurations when installed within the curvilinear duct.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

"ASTM" refers to American Society for Testing and Materials and is used to identify a test method by number. The year of the test method is either identified by suffix following the test number or is the most recent test method prior to the priority date of this document.

Figure 1A:
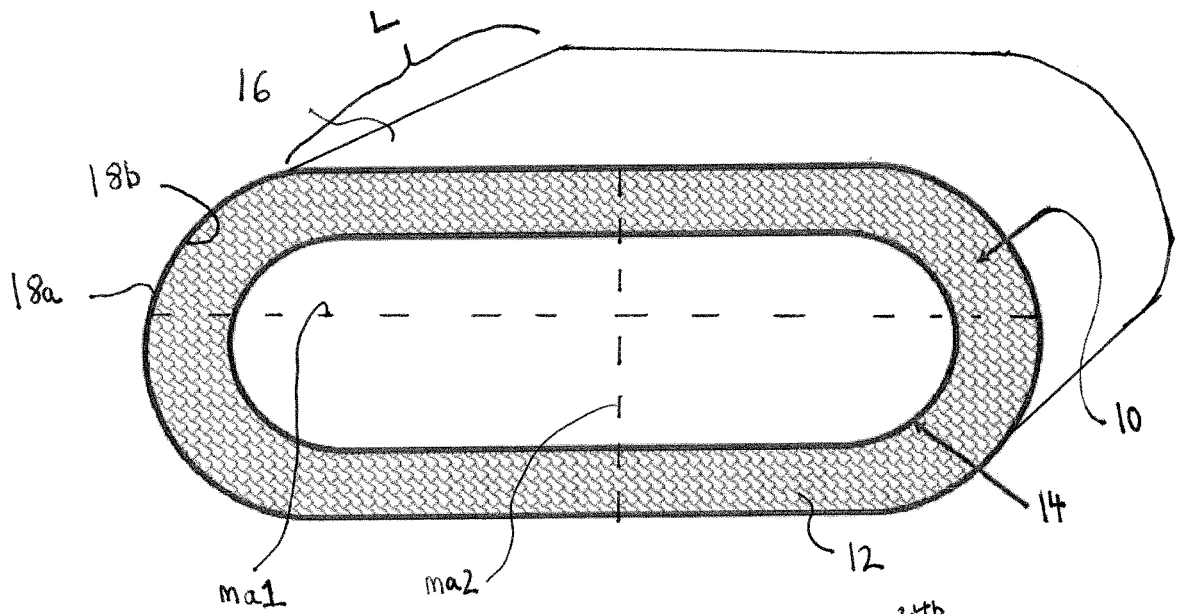
FIG. 1A is a perspective view of a duct liner insulation installed within a flat oval duct in accordance with an exemplary embodiment of the present disclosure.
Figure 1B:
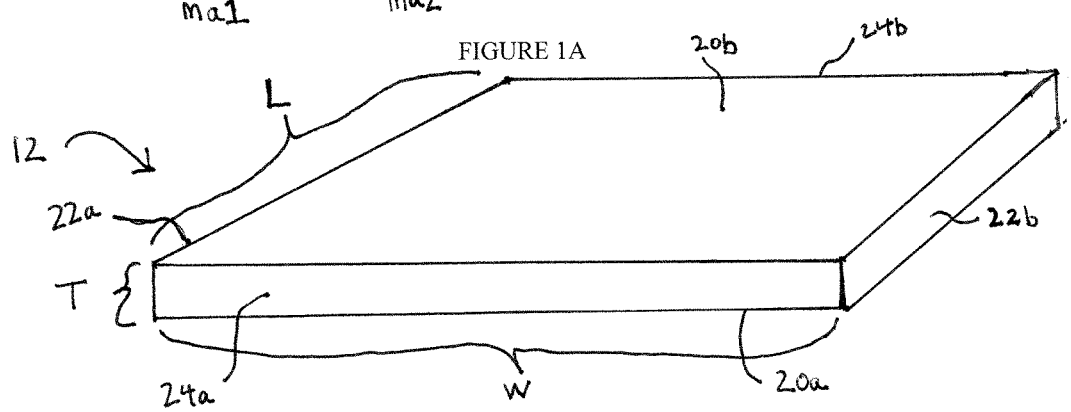
FIGS. 1B and 1C are perspective views of an insulation layer and an elastically deformable layer respectively, prior to installation within the duct liner insulation of FIG. 1A.
Figure 1C:
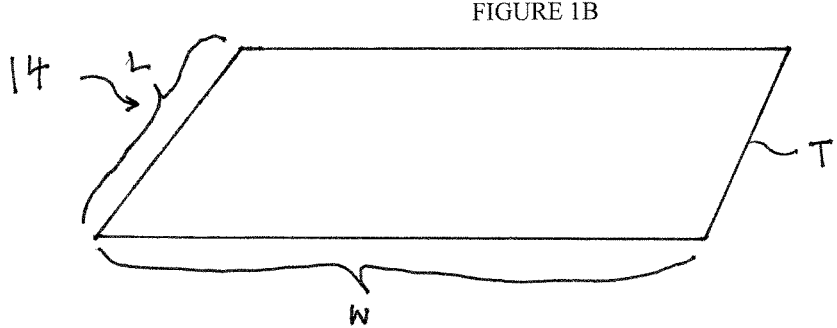
Figure 2A:
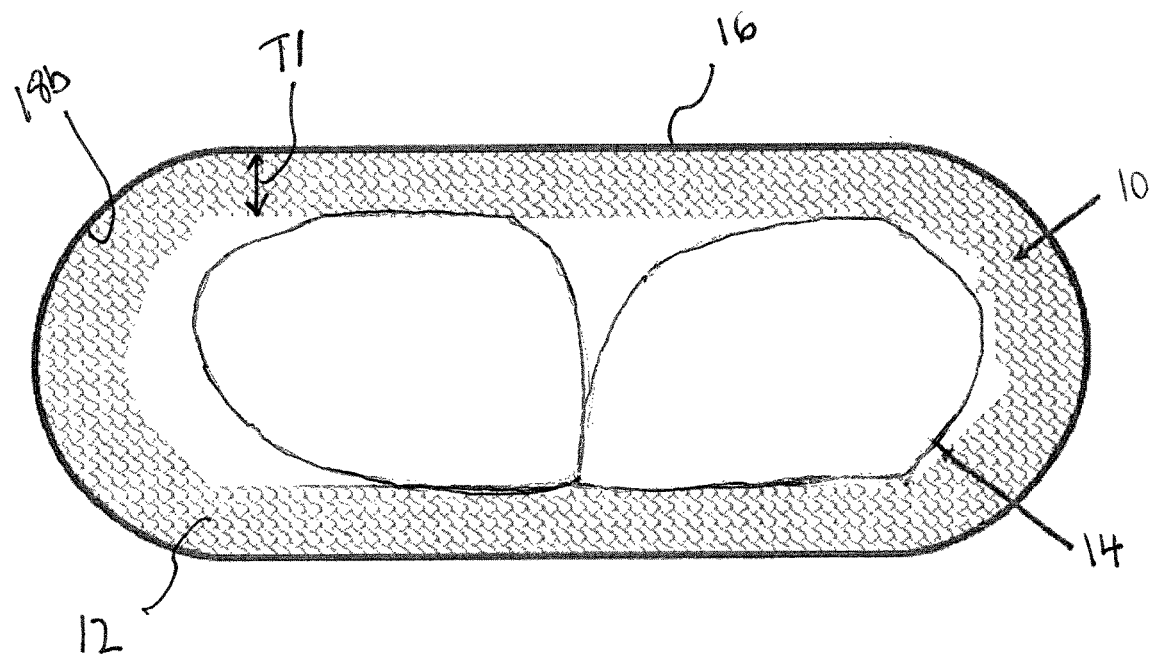
FIGS. 2A-2B illustrate installation of the duct liner insulation of FIG. 1A in accordance with an exemplary embodiment of the present disclosure, the elastically deformable layer being in a collapsed configuration during initial insertion into a flat oval duct as shown in FIG. 2A and in an expanded configuration when installed within the flat oval duct as shown in FIG. 2B.
Figure 2B:
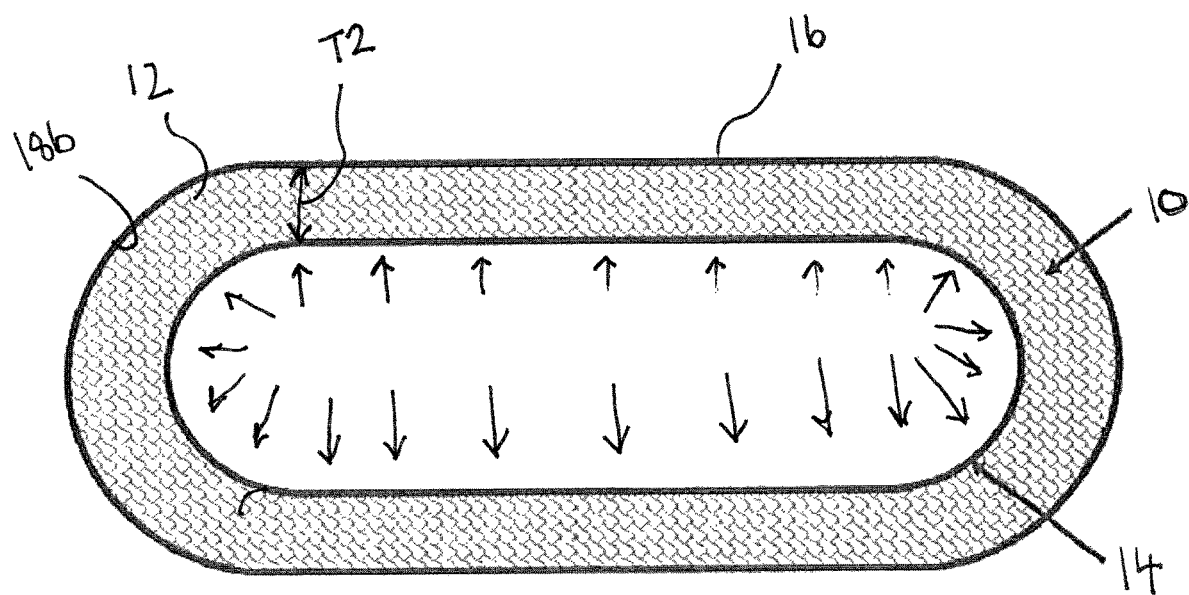
Figure 3A:
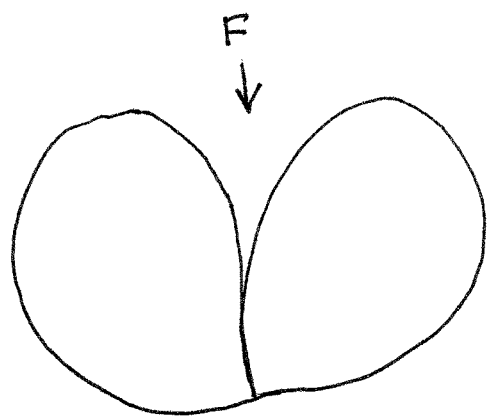
FIGS. 3A-3D illustrate various collapsed configurations of the elastically deformable layer for initial insertion into a flat oval duct in accordance with exemplary embodiments of the present disclosure.
Figure 3B:
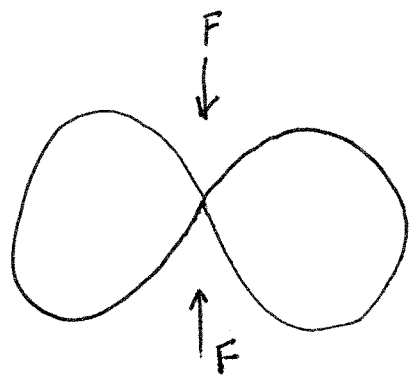
Figure 3C:
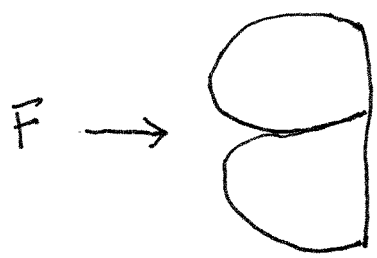
Figure 3D:
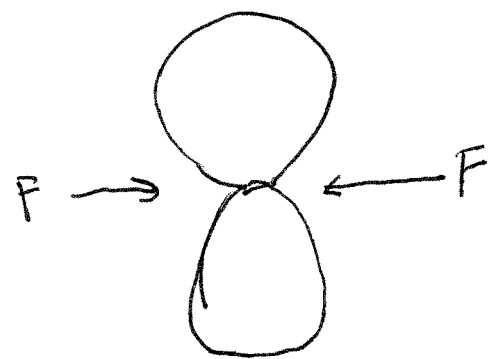

The embodiments described herein relate generally to duct liner insulation products for curvilinear ducts, and more specifically relate to methods and materials to universally fit duct liner insulation for lining oval ducts in HVAC systems. With reference to FIGS. 1A-1C, a duct liner insulation 10 as described herein includes an insulation layer 12 and an elastically deformable layer 14 configured to compress the insulation layer 12 against an interior surface of a curvilinear duct (e.g., an oval duct) in a substantially uniform manner creating an even or substantially even layer (e.g., thickness) of insulation along the interior surface of the duct, as described in more detail below (FIGS. 2A-2B). The duct liner insulation 10 (e.g., insulation layer 12 or elastically deformable layer 14) may be configured as a blanket, mat, board, batt, pipe, sheet, or roll. While the duct liner insulation 10 is installed within a flat oval duct 16 as illustrated in FIG. 1A, duct liner insulation as described herein may be installed within other shaped ducts including true oval, round, or spiral. The oval duct 16 includes an interior surface 18b (e.g., inner periphery) exposed to an airstream, an exterior surface 18a (e.g., outer periphery) extending around the interior surface 18, and an overall duct length L. As the oval duct 16 has an flat oval cross sectional configuration, the oval duct 16 has major and minor axes (e.g., identified as ma1 and ma2, respectively). The duct liner insulation 10 (e.g., insulation layer 12 or elastically deformable layer 14) mirror or have substantially the same cross sectional configuration (e.g., a flat oval duct) as the interior surface 18b when the duct liner insulation 10 is installed within the oval duct 16.

In some embodiments, the insulation layer 12 is a blanket (FIG. 1B) with a width W, length L, and thickness T1 (e.g., uncompressed thickness). The insulation layer 12 may be a fiberglass blanket with the width pre-selected or cut to match the duct length of oval duct 16. A user or fabricator may then cut the insulation layer 12 to the proper length as desired or sized to line the interior surface 18b of the oval duct 16. For example, the insulation layer 12 may be a fiberglass blanket cut from a roll with a pre-determined or selected width and thickness as provided from a manufacturer. The insulation layer 12 may include opposing bottom and top surfaces 20a and 20b, lateral sides 22a and 22b, and front and rear ends 24a and 24b. The insulation layer 12 may be folded or bent to abut and couple the front and rear ends 24a and 24b of the blanket together (e.g., with adhesive). In some embodiments, the ends 24a and 24b of the blanket may be abutted or coupled together prior to installing or lining the insulation layer 12 along or within the interior surface 18b the oval duct 16. In other embodiments, the ends 24a and 24b of the blanket may be abutted or coupled together after installing or lining the insulation layer 12 along or within the interior surface 18b the oval duct 16. The top surface 20b is exposed to the airstream through the oval duct 16 while the bottom surface 20a extends along the interior surface 18b of the oval duct 16 when installed.

In other embodiments, the insulation layer 12 may be a fiberglass blanket with the length pre-selected or cut to match the duct length of oval duct 16. A user or fabricator may then cut the insulation layer 12 to the proper width as desired or necessary to line the interior surface 18b of the oval duct 16. For example, the insulation layer 12 may be a fiberglass blanket cut from a roll with a pre-determined or selected length and thickness as provided from the manufacturer. The insulation layer 12 may be folded or bent to abut and couple the opposing lateral sides 22a and 22b of the blanket together (e.g., with adhesive) to line the interior surface 18b of the oval duct 16. In yet further embodiments, the insulation layer 12 may be a fiberglass blanket provided with a pre-determined or selected width, length, and thickness as provided from the manufacturer.

The insulation layer 12 may have an average density or resiliency sufficient to remain in position or recover adequately within the oval duct 16 after installation. In some embodiments, the insulation layer 12 has an average density to remain in position or recover adequately within the oval duct 16 without the use of the elastically deformable layer 14. In other embodiments, the use of the elastically deformable layer 14 is required, particularly with un-faced fiber glass insulation layers 12 to provide a consistent or substantially consistent airstream surface (e.g., a smooth airstream surface) to minimize air flow resistance or control potential condensation.

For example, the insulation layer 12 may have an average density between 0.4 pcf to 1.6 pcf, 0.5 pcf to 1.5 pcf, 0.5 pcf to 1.4 pcf, 0.6 pcf to 1.4 pcf, 0.6 pcf to 0.9 pcf, 0.7 pcf to 0.9 pcf, 0.8 pcf, or any value therebetween. A density of the insulation layer 12 may be selected such that a consistent or substantially consistent airstream surface is provided (e.g., a smooth airstream surface) or a desired R-value (e.g., up to or including R-4, R-6, R-8, R-10, R-12) is achieved after installation and compression by the elastically deformable layer 14. For example, if the insulation layer 12 has too low of a density (e.g., about 0.5 pcf or less), the insulation layer may not have sufficient resiliency to remain in position or recover adequately even with compression by the elastically deformable layer 14. However, if the insulation layer 12 has too high of a density (e.g., about 1.4 pcf or more), while insulation layer 12 may have adequate resiliency to remain in position, an unsmooth or inconsistent airstream surface may result as it recovers within the duct 16. Additionally, if the insulation layer 12 has too high of a density, the elastically deformable layer 14 may not be able to adequately compress the insulation layer 12 to a desired thickness to maintain a smooth or consistent airstream surface or achieve a desired R-value. In further embodiments, a thickness (e.g., uncompressed thickness T1) of the insulation layer 12 may also be selected depending on a desired R-value of the installed duct liner insulation 10, as described in more detail below with respect to FIGS. 2A-2B.

The insulation layer 12 may be a rigid, semi-rigid, or flexible insulation layer. The insulation layer 12 may be constructed or composed of a fibrous material including, but not limited to, fiberglass, mineral wool, or cellulose. For example, the insulation layer 12 may be constructed from inorganic glass fibers bonded together with a thermosetting resin. Further, in some embodiments, the insulation layer 12 may be constructed specifically without or excluding foam, polyiso, or other substantially incompressible material. In order to decrease manufacturing costs, in some embodiments, the opposing bottom and top surfaces 20a and 20b of the insulation layer 12 do not include additional layers (e.g., facers or coatings). However, in other embodiments, the opposing bottom and top surfaces 20a and 20b of the insulation layer 12 may include such additional layers (e.g., between the interior surface of the duct 18b or elastically deformable layer 14).

As discussed above, the elastically deformable layer 14 may be a mat or liner configured to compress the insulation layer 12 against the interior surface 18b of the oval duct 16 when installed. The elastically deformable layer 12 is made of a material or has a density that exhibits sufficient "springiness" (e.g., elasticity, resiliency, or flexibility) to compress the insulation layer 12 to create an even or substantially even layer of insulation around the interior surface 18b of the oval duct 16 and a smooth and consistent airstream surface therethrough, allowing for improved air flow efficiency in the HVAC system. Additionally, the elastically deformable layer 14 may support the insulation layer 12 within the duct 16 such that the insulation layer 12 does not droop or sag downward which may detrimentally affect its thermal or insulation performance. Further, the elastically deformable layer 14 may also function as a cover or liner (e.g., facer) to contain any exposed fibers or fibers from the insulation layer 12 that may dislodge into the airstream through the duct 16, reduce or prevent potential condensation in the duct, or act as a smoke barrier as described in more detail below.

As illustrated in FIG. 1C, the elastically deformable layer 14 may be a mat or liner with a width W, length L, and a nominal thickness T. Similarly as described above with respect to the insulation layer 12, the elastically deformable layer may also have either a width or length pre-selected or cut to match the duct length of oval duct 16 or insulation layer 12 (e.g., provided by the manufacturer) such that the elastically deformable layer 14 extends along, covers, or overlays the entire or substantially the entire top surface 20b of the insulation layer 12 when installed. A user or fabricator may cut the elastically deformable layer 14 (e.g., at a job site) to the proper length or width depending on whether width or length is the pre-selected dimension, as desired or sized to compress the insulation layer 12 from thickness T1 to a compressed thickness T2 to achieve a desired R-value of the insulation 10 as described in more detail below. Depending on the pre-selected dimension (e.g., width or length), ends or lateral sides of the elastically deformable layer may then be abutted or coupled together (e.g., joined with adhesive). In some embodiments, a dimension of the elastically deformable layer 14 (e.g., width or length) is pre-selected or cut to a size that does not match the length of the oval duct 16. For example, in some embodiments, a dimension of the elastically deformable layer 14 (e.g., width or length) is pre-selected or cut to a shorter value such that the elastically deformable layer 14 does not extend along, cover, or overlay the entire or substantially the entire top surface 20b of the insulation layer 12 when installed. In yet further embodiments, the elastically deformable layer 14 may be provided with a pre-selected or cut width, length, and thickness.

As the duct liner insulation 10 described herein is generally used in buildings, the duct liner insulation 10 may need to meet or satisfy certain building codes or ratings including flame spread smoke rating (ASTM E 84). For example, the elastically deformable layer 14 may be a mat or liner constructed or composed of nonwoven inorganic glass or other suitable material. The layer 14 may be coated with a thermoset binder (e.g., to seal pores and create a water-resistant surface). In other embodiments, the elastically deformable layer 14 may be constructed or composed of other materials including PVC, plastic, or thin metal liners. As discussed above, the elastically deformable layer 14 is made of a material or has a density that exhibits sufficient "springiness" (e.g., elasticity, resiliency, or flexibility) to compress the insulation layer 12. For example, the elastically deformable layer 14 may have a density between 1 pcf and 3 pcf, 1.5 pcf and 2.5 pcf, 2 pcf, or any value therebetween.

With reference to FIGS. 2A-2B, installation of the duct liner insulation 10 within the oval duct 16 is illustrated. As discussed above, the insulation layer 12 with a pre-selected width or length may be cut to a desired dimension with ends or lateral sides joined to line the interior surface 18b of the oval duct 16 accordingly. The insulation layer 12 may have an average density (e.g., 0.8 pcf) sufficient to remain in position within the oval duct 16 with a substantially consistent airstream surface. The insulation layer 12 has an uncompressed thickness T1. As discussed above, the elastically deformable layer 14 with a pre-selected width or length may also be cut to a desired dimension with ends or lateral sides joined to line the insulation layer 12 (e.g., top surface 20b). The elastically deformable layer 14 may then be positioned or inserted within an interior space or volume within the insulation layer 12 in a collapsed configuration (FIG. 2A).

Upon application of a force (e.g., a normal force), the elastically deformable layer 14 may be moved, compressed, or deformed from an expanded configuration (e.g., having a substantially oval cross sectional configuration) to the collapsed configuration (e.g., having a substantially "figure eight" type cross sectional configuration) for insertion into the oval duct 16. A downward force applied to a midpoint or center of a top surface of the elastically deformable layer 14 may move the elastically deformable layer 14 into the collapsed configuration from the expanded configuration for insertion into the oval duct 16. In other embodiments, the elastically deformable layer 14 may be deformed into collapsed configurations with other cross sectional configurations depending on direction and location of the force applied to the elastically deformable layer 14 when in the expanded configuration (FIGS. 3A-3D). While the elastically deformable layer 14 is illustrated as being installed within the duct 16 after the insulation layer 12, in other embodiments, the elastically deformable layer 14 may be positioned within the insulation layer 12 prior to being installed within the duct 16 such that the insulation layer 12 and elastically deformable layer 14 are inserted within the duct 16 simultaneously. In such embodiments, a force may be applied on both the insulation layer 12 and elastically deformable layer 14 as the layers are inserted into the duct 16 (e.g., in collapsed configurations).

Once the elastically deformable layer 14 is positioned within the duct 16 (e.g., within the insulation layer 12), the force may be removed or released. In other embodiments, the force may be removed or released prior to the elastically deformable layer 14 being positioned within the duct 16. In such embodiments, the elastically deformable layer 14 is capable of being maintained in the collapsed configuration after the force is removed and another force may be applied (e.g., outward force) to move the elastically deformable layer 14 to the expanded configuration. In yet further embodiments, an additional force may be applied (e.g., outward force) to move the elastically deformable layer 14 to the expanded configuration after the elastically deformable layer 14 is positioned within the duct 16 as well as removing the original force. As the force is removed or an outward force is applied, the elastically deformable layer 14 returns to the expanded configuration from the collapsed configuration as illustrated by outward arrows in FIG. 2B and compresses the insulation layer 12. The elastically deformable layer 14 may be coupled to the insulation layer 12 (e.g., with adhesive) after it returns to the expanded configuration to hold the layers together.

As discussed above, the elastically deformable layer 14 is sufficiently resilient to compress the insulation layer 12 (e.g., in the expanded configuration) to create an even or substantially even layer of insulation around the interior surface 18b of the oval duct 16 with a uniform thickness and a smooth and consistent airstream surface therethrough. The elastically deformable layer 14 compresses the thickness of the insulation layer 12 from T1 to T2 as it returns to the expanded configuration. A user or fabricator may cut the elastically deformable layer 14 (e.g., at a job site) to the proper length or width depending on the pre-selected dimension (e.g., width or length), in order to compress the insulation layer 12 to a desired compressed thickness T2 for achieving a desired R-value. For example, the length the elastically deformable layer 14 is cut to (e.g., if the width dimension is pre-selected) directly correlates to the amount of compression achievable. That is, as length of the elastically deformable layer 14 is increased, a proportional increase in potential compression of T1 or decrease in T2 is achieved relative to or as compared to a shorter length elastically deformable layer 14. Therefore, a user or fabricator may choose to cut the elastically deformable layer 14 to a length required to achieve a desired T2 and R-value. Generally, increased insulation thickness will proportionally increase R-value. In other embodiments, a width of the elastically deformable layer 14 is cut to (e.g., if the length dimension is pre-selected) directly correlates to the amount of compression achievable.

In accordance with an exemplary embodiment, a user or fabricator may want to achieve R-12 with the duct liner insulation 10. The insulation layer 12 may be an approximately 3.5 inch thick fiber glass blanket (e.g., T1=3.5 inches). If the width dimension is pre-selected, the user or fabricator may cut the elastically deformable layer 14 (e.g., at a job site) to the proper length to achieve R-12 with the duct line insulation 10. For example, the user or fabricator may cut the elastically deformable layer 14 to a length such that after returning to the expanded configuration within the duct 16, the elastically deformable layer 14 compresses the insulation layer 12 to a substantially uniform thickness of approximately 3.0 inches (e.g., T2=3.0 inches) to achieve R-12. Therefore, the thickness compression or delta T achievable (e.g., T1-T2) is correlated to the length of the elastically deformable layer 14 (e.g., when the width dimension is pre-selected). The delta T achievable may also be correlated to one or more of: material properties of the layers (e.g., density) or thickness of the layers.

In accordance with exemplary embodiments, the elastically deformable layer 14 may be provided to achieve delta T or compression of the insulation layer 12 up to and including 0.10 inches, 0.15 inches, 0.20 inches, 0.25 inches, 0.30 inches, 0.35 inches, 0.40 inches, 0.45 inches, 0.50 inches, 0.55 inches, 0.60 inches, 0.65 inches, 0.70 inches, 0.75 inches, 0.80 inches, 0.85 inches, 0.90 inches, 0.95 inches, 1.00 inches or any value therebetween. Insulation layer 12 may be provided with a thickness T1 between 0.5 inches and 4 inches, 1.0 inches to 3.5 inches, 1.5 inches to 3.5 inches, 1.5 inches to 3.0 inches, 2.0 inches to 2.5 inches, and any value therebetween.

As illustrated in FIGS. 3A-3D, various forces in one or more directions may be applied to different portions of the elastically deformable layer 14 in the expanded configuration to move or deform the elastically deformable layer 14 into the collapsed configuration with various cross sectional configurations for installation within a duct (e.g., duct 16). Once the force is removed or an additional outward force applied, the elastically deformable layer 14 may return to the expanded configuration to compress, contain, or support the insulation layer 12 against the interior surface 18b of the duct 16. While illustrated as being applied to mid or center points of lateral, top, or bottom surfaces of the elastically deformable layer 14, forces may also be applied offset from a central axis.

The duct liner insulation 10 is referred to as a universal solution as described herein because a customized product is not required for oval duct sizes of different dimensions. That is the duct liner insulation 10, in particular the insulation layer 12, may be constructed without kerfs and may be used with any or virtually any duct sizes as both the insulation layer 12 and elastically deformable layer 14 may be cut to desired dimensions to achieve desired uniform thicknesses (e.g., compression) and R-values. Therefore, the duct liner insulation 10 may exclude one or more rows of kerfs. In some embodiments, the insulation layer 12 and elastically deformable layer 14 are not coupled (e.g., with adhesive) or otherwise bonded together prior to installation within the oval duct 16.

While referring specifically to lining curvilinear ducts including round and flat oval ducts in several embodiments, the duct liner insulation 10 may be installed or line ducts with other cross sectional configurations including square, rectangular, or triangular. Additionally, in some embodiments, the duct liner insulation 10 may be used to insulate or lines duct transitions and fittings as well. Further, the duct liner insulation 10 may in addition, or instead, may line or insulate an exterior or outer surface of an insulated pipe or duct (e.g., using the flexible or elastically deformable layer 14 as an external wrap or liner). In some embodiments, exposed ends or lateral sides of the duct liner insulation 10 (e.g., insulation layer 12 or elastically deformable layer 14) when installed within a duct may be coated (e.g., with a water resistant coating), glued, or otherwise covered or overlapped with additional material (e.g., over the joints or seams) to prevent air flow into these exposed portions.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth. The term "or" in reference to a list of two or more items, covers all of the following interpretations of the word: any of the items in the list, all of the items in the list, and any combination of items in the list.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of installing duct liner insulation in a curvilinear duct, the method comprising:
   positioning an insulation layer configured to line an interior surface of a curvilinear duct within the curvilinear duct, the insulation layer having a density of between about 0.5 pcf and 1.4 pcf; and
   positioning an elastically deformable layer within the curvilinear duct, the elastically deformable layer having a density of between about 1 pcf and 3 pcf so as to exhibit sufficient springiness to compress the insulation layer against the interior surface of the curvilinear duct such that the insulation layer extends substantially uniformly around an inner periphery of the curvilinear duct.

2. The method of installing duct liner insulation of claim 1, wherein the insulation layer and elastically deformable layer are positioned within the curvilinear duct simultaneously.

3. The method of installing duct liner insulation of claim 1, wherein the insulation layer is positioned within the curvilinear duct prior to the elastically deformable layer.

4. The method of installing duct liner insulation of claim 1, further comprising applying a force upon the elastically deformable layer to move the elastically deformable layer from an expanded position to a collapsed position prior to positioning the elastically deformable layer within the curvilinear duct.

5. The method of installing duct liner insulation of claim 4, further comprising positioning the elastically deformable layer within the curvilinear duct in the collapsed position.

6. The method of installing duct liner insulation of claim 5, further comprising releasing the applied force upon the elastically deformable layer after positioning the elastically deformable layer within the curvilinear duct, the elastically deformable layer returning to the expanded position within the curvilinear duct after the applied force is released.

7. The method of installing duct liner insulation of claim 6, further comprising compressing the insulation layer against the interior surface of the curvilinear duct such that the insulation layer extends substantially uniformly around an inner periphery of the curvilinear duct as the elastically deformable layer returns to the expanded position within the curvilinear duct.

8. The method of installing duct liner insulation of claim 5, wherein the curvilinear duct has a flat oval cross sectional configuration.

9. The method of installing duct liner insulation of claim 1, wherein the insulation layer and the elastically deformable layer have substantially same cross sectional configurations as the curvilinear duct when the insulation and elastically deformable layers are installed within the curvilinear duct.

10. The method of installing duct liner insulation of claim 1, wherein the insulation layer has a first thickness when installed within the curvilinear duct and a second thickness when compressed against the interior surface of the curvilinear duct by the elastically deformable layer, wherein the second thickness is less than the first thickness.

11. The method of installing duct liner insulation of claim 1, further comprising coupling the elastically deformable layer to the insulation layer after the elastically deformable and insulation layers are positioned within the curvilinear duct.

12. The method of installing duct liner insulation of claim 1, further comprising applying a force upon the elastically deformable layer to move the elastically deformable layer from an expanded position to a collapsed position prior to positioning the elastically deformable layer within the curvilinear duct.

13. The method of installing duct liner insulation of claim 12, further comprising positioning the elastically deformable layer within the curvilinear duct in the collapsed position.

14. The method of installing duct liner insulation of claim 13, further comprising releasing the applied force upon the elastically deformable layer after positioning the elastically deformable layer within the curvilinear duct, the elastically deformable layer returning to the expanded position within the curvilinear duct after the applied force is released.

15. The method of installing duct liner insulation of claim 14, further comprising compressing the insulation layer against the interior surface of the curvilinear duct such that the insulation layer extends substantially uniformly around an inner periphery of the curvilinear duct as the elastically deformable layer returns to the expanded position within the curvilinear duct.

16. A method of installing duct liner insulation in a curvilinear duct, the method comprising:
   positioning an insulation layer configured to line an interior surface of a curvilinear duct within the curvilinear duct; and
   positioning an elastically deformable layer within the curvilinear duct, the elastically deformable layer is configured to compress the insulation layer against the interior surface of the curvilinear duct such that the insulation layer extends substantially uniformly around an inner periphery of the curvilinear duct, wherein:
   the insulation layer and elastically deformable layer are positioned within the curvilinear duct simultaneously; and
   the elastically deformable layer is positioned within the insulation layer both prior to installation and after installation.

17. The method of installing duct liner insulation of claim 16, wherein the insulation layer and the elastically deformable layer have substantially same cross sectional configurations as the curvilinear duct when the insulation and elastically deformable layers are installed within the curvilinear duct.

18. The method of installing duct liner insulation of claim 16, wherein the curvilinear duct has a flat oval cross sectional configuration.

19. The method of installing duct liner insulation of claim 16, wherein the insulation layer has a first thickness when installed within the curvilinear duct and a second thickness when compressed against the interior surface of the curvilinear duct by the elastically deformable layer, wherein the second thickness is less than the first thickness.

* * * * *